United States Patent [19]

Devino

[11] Patent Number: 4,652,919

[45] Date of Patent: Mar. 24, 1987

[54] VIDEO COLOR TRANSMISSION SYSTEM WITH DUAL AUDIO CHANNELS

[75] Inventor: Steven Devino, Derry, N.H.

[73] Assignee: Grumman Aerospace Corporation, Bethpage, N.Y.

[21] Appl. No.: 734,515

[22] Filed: May 16, 1985

[51] Int. Cl.$^4$ ............................................... H04N 7/04
[52] U.S. Cl. ....................................... 358/143; 358/82
[58] Field of Search ................. 358/143, 144, 142, 12, 358/82, 198, 181; 381/1, 2; 370/11, 69; 360/8, 32, 19.1

[56] References Cited

U.S. PATENT DOCUMENTS

| | | | |
|---|---|---|---|
| 2,301,395 | 11/1942 | Goldsmith | 358/143 |
| 2,671,130 | 3/1954 | Weighton et al. | 358/145 |
| 2,878,319 | 3/1959 | Leek | 370/11 |
| 3,148,342 | 9/1964 | Holt | 332/17 |
| 3,221,098 | 11/1965 | Feldman et al. | 358/198 |
| 3,404,222 | 10/1968 | Rupley | 358/10 |
| 4,081,829 | 3/1978 | Brown | 358/82 |
| 4,167,752 | 9/1979 | Liebler et al. | 358/82 |
| 4,267,561 | 5/1981 | Karpinsky et al. | 358/82 |
| 4,302,837 | 11/1981 | Tanaka et al. | 370/69 |
| 4,321,623 | 3/1982 | Rzeszewski | 358/144 |
| 4,339,772 | 7/1982 | Eilers et al. | 358/144 |
| 4,356,810 | 10/1982 | Nakayama | 358/143 |
| 4,405,944 | 9/1983 | Eilers et al. | 358/144 |

Primary Examiner—Howard W. Britton
Assistant Examiner—Victor R. Kostak
Attorney, Agent, or Firm—Pollock, VandeSande & Priddy

[57] ABSTRACT

A video system in which the end portion of a conventional TV picture waveform, normally partially unoccupied by picture information, is encoded with a monaural audio channel which supplements the conventional TV audio channel. A transmitter includes means for encoding the audio channel with conventional video red, green and blue signals, while a receiver decodes the video signals to reconstruct the supplemental audio channel.

8 Claims, 11 Drawing Figures

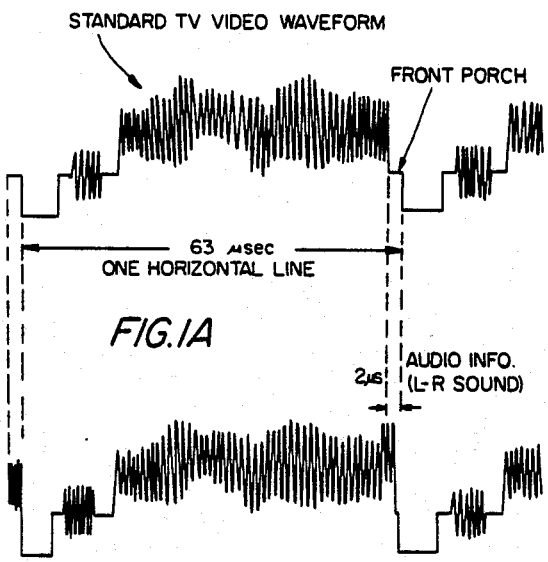
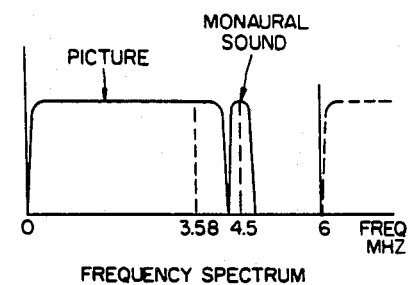
FIG.1A
FIG.1B
FIG.2A
FIG.2B
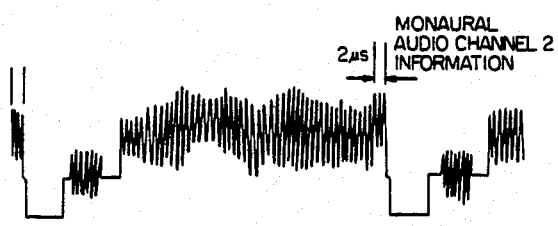
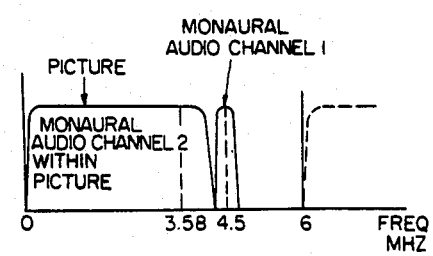
FIG.3A
FIG.3B

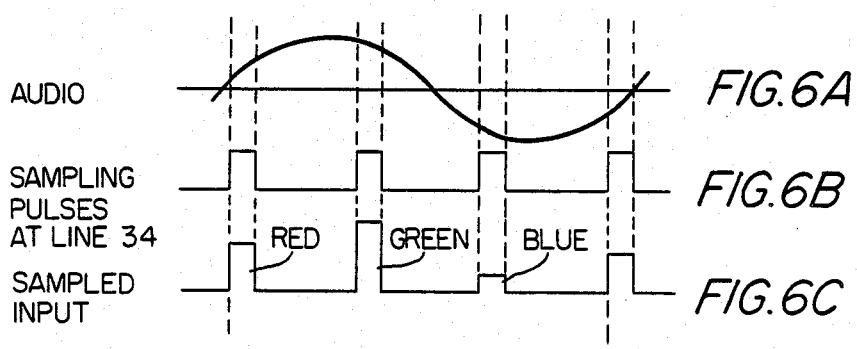

VIDEO COLOR TRANSMISSION SYSTEM WITH DUAL AUDIO CHANNELS

FIELD OF THE INVENTION

The present invention relates to a video transmission system and more particularly to a color transmission system having an audio channel contained in the picture portion of a transmitted signal.

BACKGROUND OF THE INVENTION

In co-pending patent application Ser. No. 748,759, by Berde, et al., and assigned to the present assignee, a stereo audio signal including left and right channel components may be inserted into a composite video signal by synchronizing three evenly spaced samples of the audio signal with each horizontal sync pulse in the video signal. Insertion of the three audio samples at the end of each horizontal line in the video signal is accomplished by first converting the audio samples to red, green and blue video samples. Since the converted audio samples are inserted only at the end of each video horizontal line, the "picture" portion of the video is unaffected. The usual monaural channel of a standard TV transmission is converted to include a complementary stereo signal including left and right channel components. A receiver processes both encoded stereo audio signals to decode true left and right stereo channels at the output thereof.

BRIEF DESCRIPTION OF THE PRESENT INVENTION

The present invention is a patentable extension of the referenced prior art. As in the case of the mentioned prior art, the present invention utilizes the end portion of each video horizontal line for the introduction of audio information. However, unlike the introduction of a stereo-derived audio signal (FIG. 2A), the present invention, as seen in FIG. 3A, restricts the end portion of the video waveform signal to a monaural audio channel. As seen in FIG. 3B, this monaural channel, indicated as monaural audio channel 2, has its frequency spectrum included in the picture portion of a transmitted video signal. A standard monaural audio channel accompanies the picture signal so that it is possible to watch an unaffected picture accompanied by a standard audio channel. However, by virtue of the present invention, the second manaural audio channel, encoded with the picture portion of a transmission, may be processed to yield a separate audio channel. This permits transmission of TV broadcasts with bilingual channels and allows for elimination of the conventional audio subcarrier for satellite or intrastudio transmission. Alternately, the incorporation of a second audio channel may be used as a control channel for video processing equipment.

By virtue of the present invention, it is unnecessary to incorporate a separate audio subcarrier which has been done in certain prior art approaches to offer a bilingual audio capability. Further, the present invention reduces total channel bandwidth when compared with such prior art approaches.

BRIEF DESCRIPTION OF THE FIGURES

The above-mentioned objects and advantages of the present invention will be more clearly understood when considered in conjunction with the accompanying drawings, in which:

FIG. 1A is a plot of the waveform of a standard TV video signal;

FIG. 1B is a plot of the frequency spectrum corresponding to the waveform of FIG. 1A;

FIG. 2A is a plot of the waveform of a prior art stereo TV system;

FIG. 2B is a plot of the frequency spectrum corresponding to the waveform of FIG. 1A;

FIG. 3A is a plot of a waveform indicating the inclusion of a monaural audio channel at the end of a horizontal lines as is employed in the present invention;

FIG. 3B is a frequency spectrum plot corresponding to that of FIG. 3A;

FIG. 6A is a plot of a simple sinusoidal audio signal of the type presented at the audio input;

FIG. 6B is a plot of sampling pulses generated in the transmitter portion of the present invention;

FIG. 6C is a plot of the audio input information as sampled.

DETAILED DESCRIPTION OF THE INVENTION

FIG. 3A illustrates the waveform, during one horizontal line of video, of a signal in accordance with the present invention. As is indicated, the front porch (preceding horizontal sync) of the waveform, typically two microseconds before horizontal sync, is occupied by audio information from a second channel which is further indicated in FIG. 3B. Thus, the second audio channel information is partially located within the picture information portion of the signal. The first audio channel is the same as the typical monaural sound provided in a standard TV signal (FIG. 1B). Thus, as an overview of the present invention, it will be seen that a system is offered which presents virtually all of the picture information, as would be present in a TV video signal, but with a second audio channel of information packed at the trailing front porch end of the TV video signal. Inasmuch as the first audio channel is not part of the TV video waveform, it shall not be discussed in the following explanation of the invention.

Figure 4:
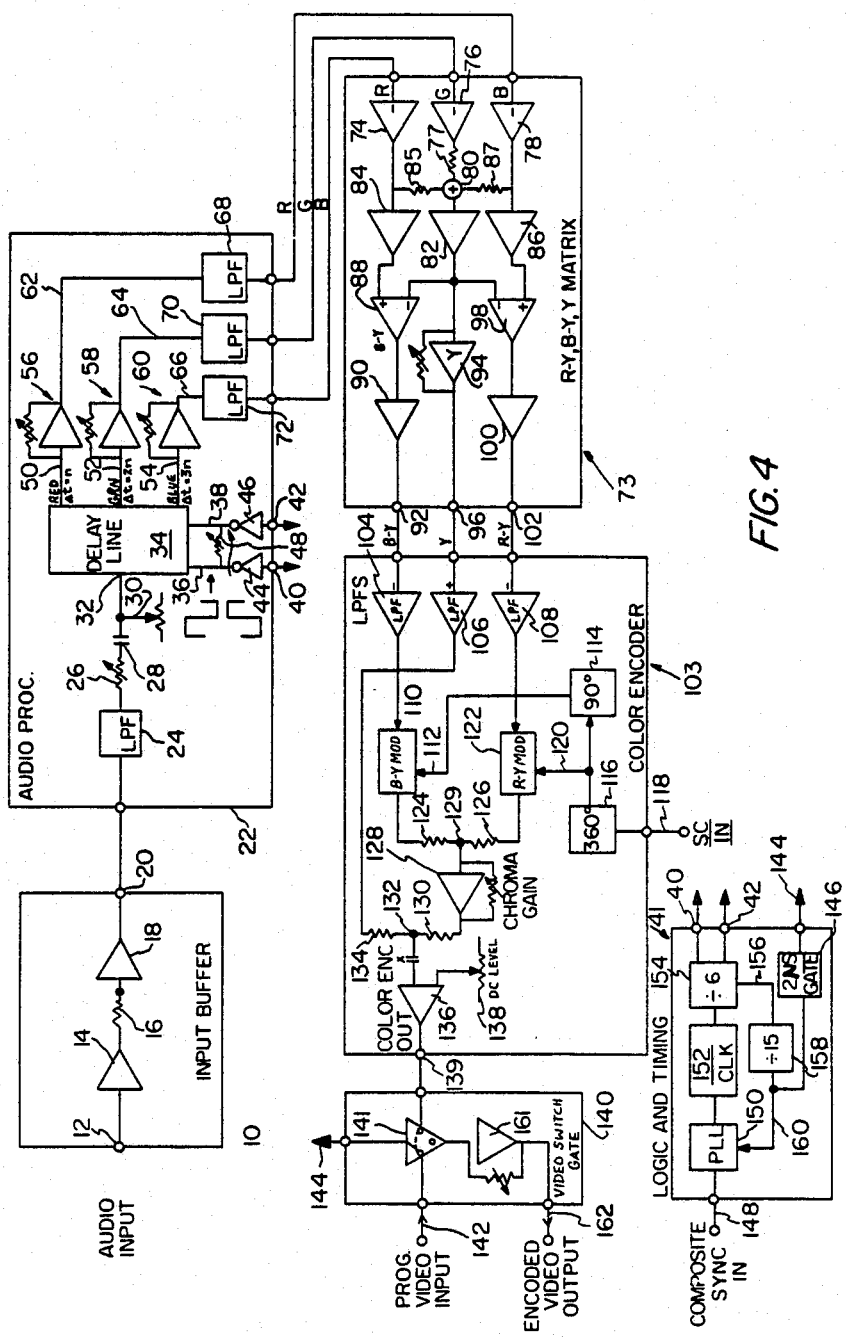
FIG. 4 is a block diagram of a transmitter circuit as employed in the present invention.

In order to encode a second audio channel with a video signal, FIG. 4 indicates an input audio terminal 12 where a single channel of audio information is introduced. The signal is fed to an input buffer 10 which typically includes serially connected amplifiers 14 and 18 with an interposing load resistor 16 connected therebetween. The output 20 of the input buffer is immediately connected to the input of an audio processing circuit generally indicated by reference numeral 22. At the input of the processing circuit is a low-pass filter 24 for filtering upper frequency interference. The signal from the low-pass filter is adjusted by a serially connected variable resistor 26 which in turn is connected to a DC blocking capacitor 28. The output terminal of the capacitor is connected to a DC level adjusting resistor 30 for lever shifting the AC signal derived from the low-pass filter 24. The output of the DC level adjusting resistor 30 is directly connected to the input 32 of a delay line 34 of conventional design which has multiple taps. The delay line compresses samples of the introduced audio signal and generates three time-displaced audio samples at output lines 50, 52 and 54. The sampling process is graphically shown in FIGS. 6A and 6B which indicate the audio input and sampling pulses in three equally spaced intervals. These samples will encode a video signal, as will be explained fully hereinafter and thus are equivalent to red, green and blue video signals (FIG. 6C) employed in conventional TV transmission systems. The timing for delay line 34 is controlled by a two-phase clock signal presented as input terminals 40 and 42. These terminals are connected to similarly numbered output terminals of a logic and timing circuit generally indicated by reference numeral 41 which will be fully discussed hereinafter. The twophase signals at input terminals 40 and 42 are connected to delay line 34 via respective buffers 44 and 46 having their outputs interconnected by a variable resistance 48, the outputs of devices 44 and 46 also respectively being connected via lines 36 and 38 to the clock input of delay line 34.

Each of the red, green and blue signals (50, 52, 54) is connected to respective operational amplifiers 56, 58 and 60 which in turn are connected to respective lowpass filters 68, 70 and 72 via interconnecting lines 62, 64 and 66. The purpose of the latter filters is again to limit high frequency noise.

In order to properly encode a video signal with the input audio information, a matrix generally indicated by reference numeral 73 is employed. Each of the red, green and blue signals (R, G, B) initially undergoes amplification at amplifiers 74, 76 and 78, respectively. The outputs from the amplifiers are connected to a single junction point 80 via respective output resistors 85, 77 and 87.

A matrix effect is achieved by connecting amplifier 84 to the output of amplifier 74 and thereafter to the differentiating amplifier 88 which generates a composite signal from the red, green and blue inputs and results in a difference signal between the blue input and a corresponding luminance (Y) resultant signal (B−Y). A second amplifier 82 which derives a luminance (Y) signal from the summing point 80 has its output connected to operational amplifier 94 which amplifies a luminance (Y) signal at the output thereof. The difference amplifier 98 receives inputs from amplifiers 86 and 82 so that a composite signal is generated at the output thereof, namely, a difference between the red signal and a generated luminance signal (R−Y). Output amplifiers 90 and 100 are respectively connected to the outputs of amplifiers 88 and 98; and the output from matrix 73 is indicated at terminals 92, 96 and 102 which respectively carry signals indicative of (B−Y), Y, and (R−Y).

Each of the outputs from matrix 73 respectively drives a low-pass filter (104, 106 and 108) at the input of color encoder 103. The output of filter 104 drives a modulator 110 (B−Y) at a first input thereof while a second input 112 of the modulator receives a color reference subcarrier which can be adjusted for up to 360° phase shift at 116 in addition to a 90° phase shift at 114. The output from low-pass filter 108 drives a first input of a second modulator 122 (R−Y), while a second input of the modulator is connected to the color reference subcarrier signal at 118 with corresponding adjusted phase shift at 116, via connecting line 120. A chroma gain amplifier 128 has its input terminal 129 connected to the outputs of modulators 110 and 122 via respective load resistors 124 and 126. The output from the chroma gain amplifier 128 is connected to an AC coupled input via a blocking capacitor 133 of an amplifier 136, a second input of the amplifier being connected to a DC level setting potentiometer 138. The first-mentioned input of amplifier 136 is connected to the junction 132 and resistors 130 and 134 which is connected to the output of low-pass filter 106, which amplifies the luminance signal Y.

The color encoded output is connected from terminal 139 to a first input of a video switch gate 140 including switch gate 141 that has a second input 142 connected to a programmed video input, that is to say, a source of composite "picture" video. Control lead 144 is connected to a similarly numbered output of the logic and timing circuit 41.

Further considering the logic and timing circuit 41, the signal on control lead 144 is generated by a two microsecond gate 146 having its input connected through two serial dividers, namely, divide-by-six circuit 154 and divide-by-15 circuit 158. The divide-by-six circuit 154 has the two-phase outputs at terminals 40 and 42. A divide-by-15 circuit 158 has its input connected via line 156 to divide-by-six circuit 154; the output of circuit 158 being connected via lead 160 to the phase locked loop 150, the latter having a composite sync input at terminal 148 and an output which is connected to a clock 152. A feedback loop is completed by the connection of clock output 152 and divide-by-six circuit 154.

At the output of the transmitting circuit, the output of switch gate 141 is connected to operational amplifier 161, the output of which is the desired encoded composite video signal that will be transmitted to a remote receiver.

Figure 5:
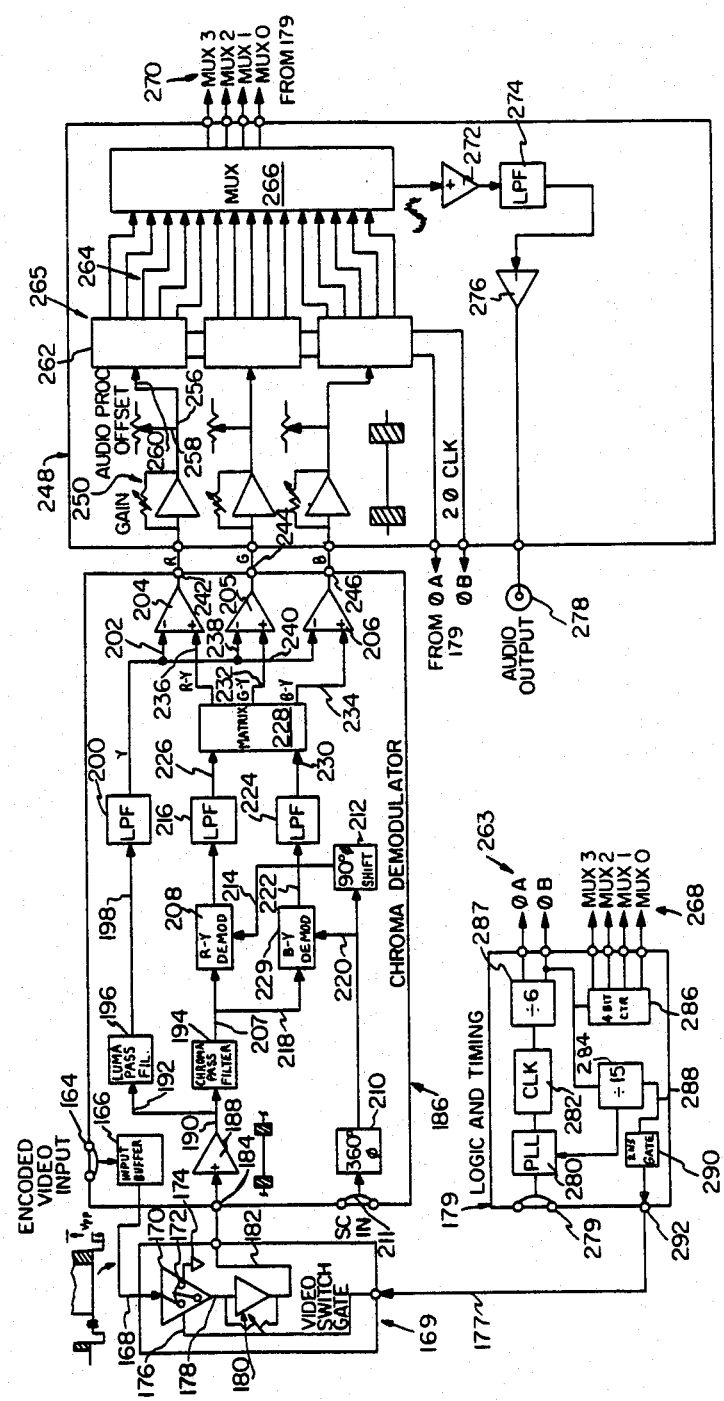
FIG. 5 is a block diagram of a receiver circuit as employed in the present invention.

The remote receiver for decoding the audio signal from the encoded video signal is indicated in FIG. 5. As will be seen in this figure, the encoded video input terminals 164 undergo input buffering at 166 and thereafter the encoded signal is fed through the input terminal 168 of video switch gate 169.

The video switch gate 169 includes a switch gate device which is switched at input 176 between the encoded input at 168 and ground input 172 which is connected to 174. The output 178 of gate 170 feeds an amplifier 180 having its output 182 connected to the input terminal 184 of a chroma demodulator generally indicated by 186. The output 190 of amplifier 188 is connected to the input of a chroma pass filter 194. The output 190 is also parallel connected to the input terminal 192 of a luminance pass filter 196. The output from filter 196 is connected via line 198 to a low-pass filter 200 which generates the decoded Y video signal at the output thereof. This video signal is connected to input 202 of difference amplifier 204 which, along with two remaining difference amplifiers 205 and 206, generates the demodulated red, green and blue video signals in preparation of audio processing. The remaining inputs to amplifiers 204, 205 and 206 are derived after the output 207 of the pass filter 194 has undergone demodulation. Specifically, demodulator 208 demodulates the R−Y video signal in response to the output of pass filter output 207 and a second input, along line 214, which bears a phase shift signal from the serially connected 90° phase shifter 212 and the 360° adjustable phase shifter 210. The latter-mentioned shifter is provided with color reference subcarrier at 211. The output from demodulator 208 then drives a low-pass filter 216, the output of which serves as a first input 226 of a demodulator matrix 228. A second input 230 of matrix 228 is provided through a parallel connected B−Y demodulator 229 which has its input 218 connected to the output 207 of filter 194. As in the case of demodulator 208, the second mentioned demodulator 229 has its output 222 connected to a low-pass filter 224, the output of which serves as the second input 230 of matrix 228. In the case of demodulator 229, a second input 220 is derived from the 360° adjustable phase shifter 210.

The first output 236 of matrix 228 carries the R—Y video signal which is input to the first difference amplifier 204. Similarly, the second output 232 of matrix 228 supplies the G—Y signal to difference amplifier 205. Finally, the third output 234 of matrix 228 is supplied to a first input of difference amplifier 206. Each of the difference amplifiers 204, 205 and 206 is provided with an input (202, 238, 240) which corresponds to the Y video signal at the output of low-pass filter 200. The difference amplifiers then respectively output the red, green and blue video signals (242, 244, 246) for introduction to an audio processor, generally indicated by reference numeral 248. Since each channel of the audio processor operates similarly, only the channel with respect to the red (R) video signal will be discussed.

The input section of the audio processor 248 includes a gain adjusting amplifier 250 having its output 256 connected to an offset potentiometer 258. The resultant output is introduced at input 260 to the first section 262 of an analog tapped delay line array 265, which is clocked by a two-phase clock generated at terminals 263 of logic and timing circuit 179. The delay line section 262 expands the red (R) samples as modulated by the transmitter circuitry. Output taps from the delay line section 262 are generally indicated by reference numeral 264 and are connected to input terminals of MUX 266. The MUX 266 performs a switching function between the outputs from the tapped delay line section 262. Control lines 270 connected to MUX 266 are activated by the MUX control signals 268, generated by logic and timing circuit 179. The resultant output from the MUX is a generally sinusoidal waveform having sample ripples superimposed thereon. Amplification occurs at the amplifier 272 and the ripples are suppressed when the signal is serially processed by the low-pass filter 274. The final amplification stage at 276 allows the original audio input to be presented at terminal 278.

The logic and timing circuit 179 has an input composite synchronization input terminal 279 which drives a phase-locked loop 280. The output of this latter circuit drives clock 282 and a divide-by-15 counter 284. The output of clock 282 drives a divide-by-six circuit 287 which in turn generates the two-phase clock signal which controls the timing of the delay line section 262 and the other delay line sections.

The output from the divide-by-six circuit 287 also drives the four-bit counter 286 and the divide-by-15 counter 284. A second output from the counter 284 drives the phase-locked loop 280 at its second input, the counter 284 generating an output along line 288 to a two microsecond gate 290. The latter gate generates a signal at output terminal 292 of logic and timing control circuit 179 which supplies the video switch gate signal along line 177.

Thus, as will be appreciated from an understanding of the present invention, a system is presented which enables full utilization or elimination of the standard monaural audio channel in TV broadcasting in addition to a second monaural audio channel which is inserted at the end of a horizontal line of video transmission, this section of a conventional TV video waveform having the absence of picture information so that the inclusion of the second audio channel does not affect the picture. This enables the viewer of a broadcast to listen to the first audio channel as transmitted or a decoded second audio channel which may, for example, include broadcast narration in a second language. As will be appreciated, this dual audio channel capability is achieved without utilization of an additional audio subcarrier which would reduce total channel bandwidth for picture information.

It should be understood that the invention is not limited to the exact details of construction shown and described herein for obvious modifications will occur to persons skilled in the art.

What is claimed is:

1. A method for receiving a programmed video signal encoded with sampled monaural audio information, the method comprising the steps:
   conditioning a received signal;
   switching between the conditioned signal and a reference signal;
   chroma demodulating the color video signals from the received signal;
   separating individual color video components from the demodulated signal; and
   expanding the video components to restore the audio information.

2. A method for transmitting a composite video signal incorporating an additional channel of audio information without interfering with picture information, the method comprising:
   buffering a monaural audio input signal;
   sampling the audio signal and compressing the samples so that they correspond to red, green and blue color video signals;
   generating a luminance signal based upon a preselected combination of the three color video signals;
   combining the signals to form a single signal; and
   generating an encoded transmitter video signal containing picture and audio information.

3. The video circuit for receiving a programmed video signal encoded with sampled manaural audio information, the circuit comprising:
   input buffer means for conditioning the received signal;
   means connected to the output of the buffer means for switching between the buffered input signal and a reference volage;
   chroma demodulating means connected at its input to the output of the switching means for demodulating color video signals from the received signals;
   matrix means connected at its input to the demodulating means output for separating individual color video components from the demodulated signal; and
   audio processing means connected at its input to the output of the matrix means for expanding the sampled audio information.

4. The structure set forth in claim 3 wherein the audio processing means includes an analog tapped delay line having inputs respectively connected to the red, green and blue color video signals, the output of the delay line having multiple taps at which the expanded samples are present; and
   multiplexing means for combining the expanded samples to form a continuous signal.

5. A video circuit for transmitting a composite video signal incorporating an additional channel of monaural audio information, without interfering with picture information, the circuit comprising:
   input buffer means for conditioning an audio input signal;
   audio processing means connected to the output of the buffer means for sampling the audio signal and compressing resultant samples so that the output of the processing means corresponds to red, green and blue color video signals;
   matrix means connected at its input to the output of the processing means for generating a luminance signal based upon a preselected combination of the three color video signals;
   color encoding means connected to the output of the matrix means for combining the signals from the matrix means as a single signal; and
   means for switching between a programmed video input and the output of the color encoding means for generating an encoded transmitter video signal containing picture and audio information from the additional channel.

6. The structure set forth in claim 5 wherein the audio processing means includes:
   an analog tapped delay line for generating the red, green and blue color video signals at equally spaced sampling intervals.

7. The structure set forth in claim 5 together with a video circuit for receiving the encoded video signal, the circuit comprising:
   input buffer means for conditioning the received signal;
   means connected to the output of the buffer means for switching between the buffered input signal and a reference voltage;
   chroma demodulating means connected to the output of the switching means for demodulating color video signals from the received signals;
   matrix means connected at its input to the demodulating means output for separating individual color video components from the demodulated signal; and
   audio processing means connected at its output to the output of the matrix means for expanding the sampled audio information to match the additional audio channel at the transmitting circuit.

8. The structure set forth in claim 7 wherein the audio processing means includes:
   an analog tapped delay line for generating the red, green and blue color video signals at equally spaced sampling intervals; and
   further wherein the receiver audio processing means includes an analog tapped delay line having inputs respectively connected to the red, green and blue color video signals, the output of the delay line having multiple taps at which the expanded samples are present; and
   multiplexing means for combining the expanded samples to form a continuous signal.

* * * * *

UNITED STATES PATENT AND TRADEMARK OFFICE
CERTIFICATE OF CORRECTION

PATENT NO. : 4,652,919
DATED : March 24, 1987
INVENTOR(S) : Steven Devino

It is certified that error appears in the above-identified patent and that said Letters Patent is hereby corrected as shown below:

Column 1, line 49, change "manaural" to --monaural--.

Column 2, line 13, change "lines" to --line--.

Column 2, line 63, change "lever" to --level--.

Column 3, line 9, change "as" to --at--.

Column 6, line 50, change "volage" to --voltage--.

Column 6, line 43, change "manaural" to --monaural--.

Signed and Sealed this

Twenty-fifth Day of August, 1987

Attest:

DONALD J. QUIGG

Attesting Officer

Commissioner of Patents and Trademarks